Feb. 21, 1961   J. N. GRAEF   2,972,673
PHOTOFLASH ATTACHMENT
Filed Jan. 25, 1956   2 Sheets-Sheet 1

Inventor
JOHN N. GRAEF
by Hill, Sherman, Meroni, Gross & Simpson
Attys.

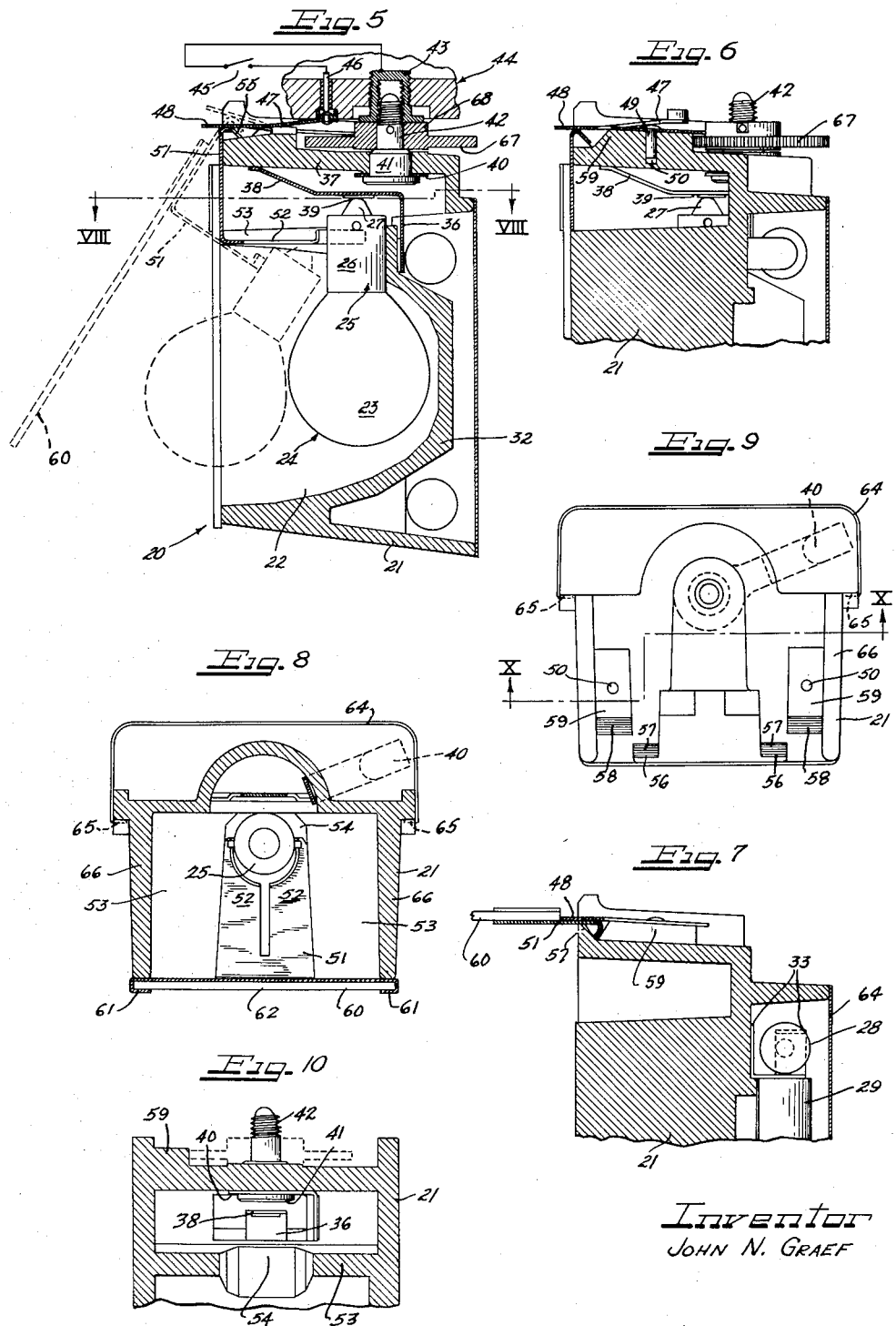

United States Patent Office 2,972,673
Patented Feb. 21, 1961

2,972,673
PHOTOFLASH ATTACHMENT
John N. Graef, 737 S. Mitchell St., Arlington Heights, Ill.
Filed Jan. 25, 1956, Ser. No. 561,233
1 Claim. (Cl. 240—1.3)

The present invention relates to photographic equipment, and more particularly to a photoflash attachment to be connected with a camera.

While numerous photoflash attachments for connection or operation with a camera and to be energized or "tripped" by actuation of the shutter mechanism of the camera, have been developed, these attachments are generally either relatively expensive or inconvenient to use and further almost universally utilize relatively large reflectors.

By the present invention, however, there is provided a highly new and improved photoflash attachment which is very economical, highly efficient, versatile convenient to use, and relatively small and lightweight.

While the embodiment of the persent invention hereinafter described in detail in this specification is a photoflash attachment of general utility, it is particularly well adapted for connection and utilization with such a camera as that described in my copending application for patent entitled "Stereoscopic Camera," U.S. Serial No. 561,234, filed on even date herewith. Photoflash attachments embodying the principles of this invention are relatively small units so that the actual reflector portion of the unit is only slightly larger than the glass globe of a standard miniature photoflash bulb and a lens cover covering the reflector portion is of the annular prismatic type to concentrate the relatively wide angle light-diffusion from the small reflector and direct the same in a relatively narrow beam having a width substantially the same as or slightly greater than the optic angle of vision for the camera lenses.

In addition to concentrating the light, the lens is further effective to shield the photoflash bulb so that in the event of fracture or explosion thereof, the glass fragments will not escape from the reflector portion of the attachment to injure anyone standing before the attachment.

Further in accordance with this invention, the lens may be carried on a hinge bracket which has formed as a part thereof or integrally therewith or attached thereto, a bulb base clamp which will form one electrical connection to the base of the bulb and will grip the base of the bulb so that after the bulb has been flashed, hinging movement of the lens and bracket will carry the bulb out of the reflector for convenient and easy removal thereof to a waste depository.

Photoflash attachments embodying this invention also obviate the need for positive seating of the bulb in a socket such as a spring socket or the like commonly used in photoflash equipment heretofore available but permits insertion of the bulb into the flash attachment by merely dropping or placing the bulb into the reflector cavity. Thereafter, closing the lens bracket and lens over the reflector cavity will cause the bulb to be gripped by the bracket and further provide for appropriate electrical connections to the bulb for energization thereof at the desired time.

The foregoing described features of the present invention incorporate important objects thereof whereby it is an important object and feature of the present invention to provide a new and improved highly economical, convenient and efficient photoflash attachment.

Also, it is an important object and features of the present invention to provide a new and improved photoflash attachment having a relatively small reflector which is only slightly larger than the glass globe of a standard miniature photoflash bulb.

Still another object of the present invention is to provide a new and improved photoflash attachment which obviates any necessity for setting the bulb into a connecting socket such as a spring socket or the like but which permits placing the bulb in the attachment by merely "dropping" the same into the reflector cavity and closing the lens and carrying bracket therefor over the cavity whereby electrical connections to the bulb are automatically effected.

Still other objects, features and advantages of the present invention will become readily apparent from the following detailed description of the present invention and an embodiment thereof, from the claim, and from the accompanying drawings, in which:

Figure 5 is a sectional view of the attachment viewed as taken substantially along the line V—V of Figure 3, and further showing the lens and supporting bracket in a partially displaced position to illustrate certain features of the invention and further schematically indicating certain portions of the electric circuit for the attachment;

Figure 6 is a fragmental sectional view of the upper portion of the attachment viewed as taken substantially along the line VI—VI of Figure 3;

Figure 7 is another fragmental sectional view of the upper portion of the photoflash attachment viewed as taken substantially along the line VII—VII of Figure 3;

Figure 8 is a sectional view of the attachment viewed as taken substantially along the broken line VIII—VIII of Figure 5;

Figure 9 is a plan view of the body and back cover of the attachment with certain additional parts shown in dotted line illustration; and Figure 10 is a sectional view of the attachment viewed as taken substantially along the line X—X of Figure 9.

As shown on the drawings:

Figure 2:
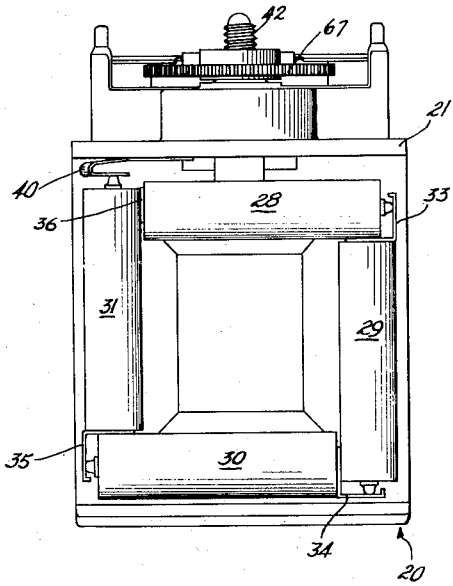
Figure 2 is a rear elevational view of the photoflash attachment with the rear cover removed therefrom to better illustrate certain of the parts thereof and to illustrate the electric energy source arrangement.

There is illustrated in the drawings an embodiment of the present invention which constitutes a photoflash attachment particularly adaptable for attachment to a stereoptic camera such as that described in my hereinabove identified copending application for patent. This attachment 20 is a complete and self-contained photoflash attachment which is operable as a light reflector and concentrator and further contains within its structure electrical power and energy sources such as batteries of the flashlight-type or "Penlite" type.

The attachment itself has a body 21 preferably formed of a moldable material such as a thermoplastic or thermosetting plastic material or such as Bakelite or the like, or hard rubber or the like, so that it may be molded or otherwise formed to the desired configuration.

This body 21 is molded so as to have a more or less paraboloid-shaped reflecting cavity 22 therein opening towards the front of the body and the face of which cavity is coated with a light-reflecting material such as a vapor deposited metal or the like to provide a light-reflecting surface for the cavity. This cavity (note Figure 5) is only somewhat larger than the glass globe 23 of a standard miniature photoflash bulb 24 having a base 25 including a pair of electrical terminals 26 and 27 thereon for connection to a source of electric energy such as batteries which may be contained within the photoflash attachment itself.

The provision of space for the batteries such as batteries 28, 29, 30 and 31 (Figure 2) is made by providing appropriate recesses in the back of the body 21 about the reflector cavity defining portion 32 of the attachment. As illustrated in Figure 2, these batteries may be connected in series through connectors 33, 34 and 35 which respectively connect the battery 28 to the battery 29, the battery 29 to the battery 30, and the battery 30 to the battery 31. These connectors 33, 34 and 35 are secured to the body 21 and are fixedly mounted thereon and are formed of conductive materials such as strip or sheet copper or brass or the like.

To connect the batteries or power source to the photoflash bulb 24, the remaining terminal of the battery 28 connects with a connector strip 36 which extends upwardly therefrom and thence forwardly to resiliently engage the upper wall 37 of the body 21 by a resilient spring-like finger portion 38 which also passes over the bulb terminal 27 to make connection therewith as at 39.

Figure 3:
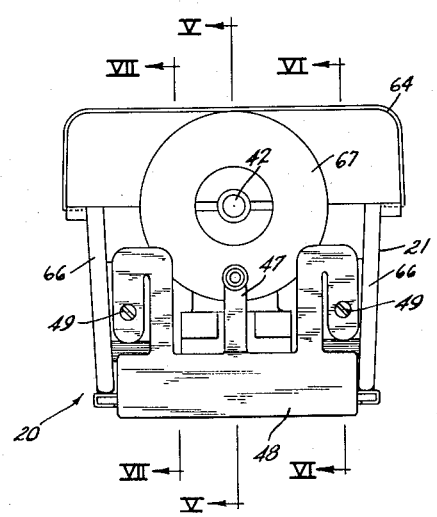
Figure 3 is a top plan view of the attachment of Figures 1 and 2.

The remaining terminal of the battery 31 is connected to a connector finger 40 (Figure 2) which also extends upwardly to the lower face of the upper wall 37 of the body 21 where it is apertured to make electrical connection with and receive the base 41 of a connecting screw 42. This screw (Figure 5) then may be connected to a threaded socket 43 in a camera 44 for electrical connection through a shutter trip switch 45 to a flash-connecting pin 46 insulatingly extending through the camera 44. This pin 46 is positioned in the camera 44 for connection to a conductive spring finger 47 on a retaining and connecting spring plate 48 which is substantially E-shaped and mounted on the upper surface of the upper wall 37 of the body 21 by a pair of screws 49 (Figures 3 and 6) received in appropriate recesses 50 in said upper wall 37. This resilient connecting and spring plate 48 thence makes resilient electrical connection to a lens mounting and hinge bracket 51 which is bent inwardly and has a bifurcated inner end portion 52 operable to engage the terminal 26 of the bulb base 25 and to frictionally clamp the same and make electrical connection thereto. Thus, when the camera trip switch or shutter switch 45 is closed, electrical energy will be passed to the bulb 24 to flash the same in the usually desired manner.

An intermediate wall 53 forming a part of the reflector cavity-defining wall 32 at the upper portion thereof and spaced just below the upper wall 37 is slotted as at 54 to permit the flash bulb base 25 to pass therethrough without obstruction. This slot 54 passes through the intermediate wall 53 and extends all the way from the rearward edge of the intermediate wall 53 to the forward edge thereof so that the intermediate wall 53 appears to be formed of two laterally displaced sections. By so slotting the wall 53, the flash bulb 24 may be easily dropped into the flash attachment with the bulb or globe portion 23 thereof in the reflector cavity 22 and with the base 25 passing through the slot 54.

When the bulb is so positioned, it is then fixed in position against the terminal strip 36 or the spring finger portion 38 thereof and clamped by the bifurcated end portion 52 of the hinge bracket 51 which frictionally and resiliently clamps the base 25.

This hinge clamp 51 is hingedly mounted on the upper forward edge of the body 21 by having a pair of hook-like upper edge portions 55 which hook over a first pair of upstanding land portions 56 (Figure 9) having rearwardly inclined faces 57 which substantially match the hooked end portion 55 of the bracket 51. The E-shaped retaining and connecting spring 48 presses the hook-shaped portion 55 downwardly onto the lands 56 and resiliently retains the same in place. The rearwardmost edge of the hook portion 55, however, will rest either on the lower portion of the inclined faces 57 or on the upper face of the upper wall 37 and operate as fulcrum points for pivotal movement of the bracket 51 so that the bracket 51 may be pivotally moved approximately 90° from the closed position as shown on the drawings. During such movement, shown at an intermediate stage in dashed lines in Figure 5, the retaining spring plate 48 will be deflected upwardly and the hooked end portion will be moved so that it will rest against forwardly inclined faces 58—58 on a second pair of lands 59—59 on the upper wall 37 of the bracket. When in that position (as shown in Figure 7) the retaining spring plate 48 will resiliently hold the bracket 51 in position since the operation and cooperation between the spring plate 48 and the bracket 51 is a toggle-type cooperation as may be seen by comparing Figure 7 with both the solid line and the dashed line illustrations of Figure 5. Thus the spring 48 presses the hooked shaped portion 55 of the hinge stamp 51 into the space between the lands 56 and 59.

Figure 1:
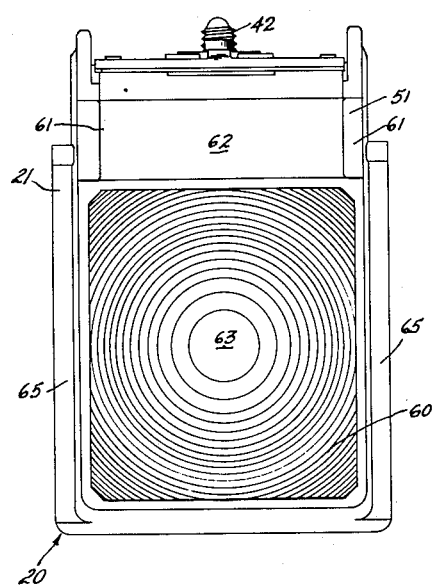
Figure 1 is a front elevational view of a photoflash attachment embodying the principles of the present invention.
Figure 4:
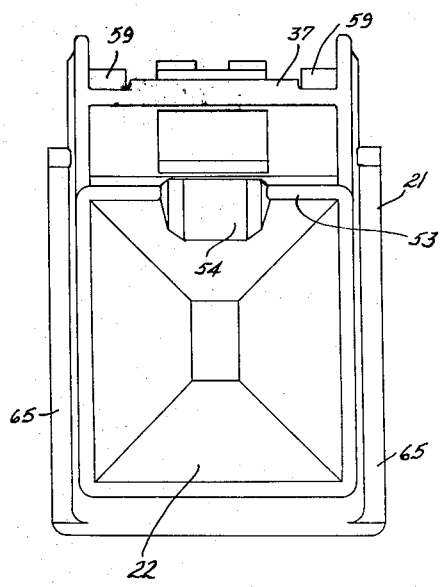
Figure 4 is a front elevational view of the photoflash attachment body.

This bracket 51 is further operable to clamp and hold a lens 60 by having laterally extending arms 61—61 with U-shaped ends effective to clamp the lateral edges of the upper portion 62 (Figures 1 and 8) of the lens 60. The main light-concentrating or multiple annular prism portion 63 of the lens 60 extends below the clamped portion 62 thereof and serves as a handle as well as a cover and light concentrator. When the attachment is in use, the lens is effective as a handle to swing or hingedly move the bulb-carrying bracket for removal of a spent or burned out photo-flash bulb from the attachment, it serves as a protective shield in the event that the photoflash bulb may explode, and due to its annular prismatic configuration, serves to concentrate the widely diffused light from the small reflector cavity.

Thus, from the foregoing it will be seen that the photoflash attachment embodying the principles of the present invention is self-contained, formed of lightweight materials, and is most convenient and easy to use. In the event that the batteries 28 through 31 should become so depleted, they may be replaced by slidably removing an appropriately configurated sheet-like rear cover member 64 which slidably engages transversely extending vertical shoulders 65—65 on the side walls 66—66 of the body 21, and near the rearward extremity thereof.

To fasten the attachment to a camera such as the one described in my hereinabove-identified copending application for patent, the screw 42 is received in a central aperture in a knurled edged thumb wheel 67 having a slotted boss 68 thereon to receive a pin extending through an aperture in the screw 42 to thereby lock the wheel 67 and the screw 42 together for corotation. Thus, the flash attachment may be set up against the lower surface of the camera described in my hereinabove-identified application and the knurled edged wheel 67 may be easily engaged by the thumb of the operator to thread the screw 42 into the receptacle 43 therefor and thereby electrically connect the camera to the flash gun and securely mount the flash gun or attachment onto the camera. Disassembly is easily effected by appropriately manipulating the wheel 67 to disengage the threads of the screw 42 from the threaded receptacle 43.

Thus, it will be seen that I have provided a flash attachment, many variations and modifications of which may be made without departing from the true spirit and scope of the novel concepts and principles of this invention and I, therefore, intend to cover all such modifications and variations as fall within the true spirit and scope of the novel concepts and principles of this invention.

I claim as my invention:

A photoflash device for supporting a glass globed bulb having a cylindrical base with laterally extending bayonet pins and with a centrally located base electrical contact comprising a body having a wall forming a reflector cavity therein with an open front and being slightly larger than the glass globe of the bulb, an intermediate wall on said body forming part of the reflector cavity wall and having a slot facing the open front of the cavity and being of a size to pass the base of the bulb so that the bulb may be dropped into the reflector cavity and the base will be guided by said slot, a terminal positioned outside of said cavity opposite said slot to be engaged by the base electrical contact of the bulb, a bracket member having a bifurcated open inner end facing said reflector cavity engaging and holding the base of the bulb in said slot and engaging the pins of the bulb and forcing the central base contact of the bulb against said terminal, a hook-like end portion on said bracket member, an upstanding land portion on said body with an adjacent inclined face substantially matching the hook-like end portion of the bracket member, said bracket pivotally supported on said hook-like end portion for movement between a bulb-release position wherein the bulb can be placed in said slot and a bulb-locking position wherein the bulb is held in said slot by said bifurcated inner end, and a retaining and connecting spring mounted on the body and pressing said hook-like end portion onto said land so that the bracket member will pivot on said hook-like portion and the bracket member will rest against said land portion in bulb-release position and the hook-like end portion will rest against the inclined face in bulb locking position to hold the bracket in said positions.

References Cited in the file of this patent

UNITED STATES PATENTS

| | | |
|---|---|---|
| 2,317,465 | Kende et al. | Apr. 27, 1943 |
| 2,477,895 | Pollock | Aug. 2, 1949 |
| 2,478,129 | Powell | Aug. 2, 1949 |
| 2,542,311 | Carlson | Feb. 20, 1951 |
| 2,622,188 | Seeger et al. | Dec. 16, 1952 |
| 2,662,968 | Sarber | Dec. 15, 1953 |
| 2,682,816 | Walden | July 6, 1954 |
| 2,740,339 | Carter | Apr. 3, 1956 |
| 2,743,351 | Gorham | Apr. 24, 1956 |
| 2,745,945 | Blount | May 15, 1956 |
| 2,747,076 | Eloranta | May 22, 1956 |
| 2,789,205 | Schwartz et al. | Apr. 16, 1957 |
| 2,812,420 | Bing et al. | Nov. 5, 1957 |

FOREIGN PATENTS

| | | |
|---|---|---|
| 696,921 | Great Britain | Sept. 9, 1953 |